(12) United States Patent
Cachapuz Santos Fontoura et al.

(10) Patent No.: US 12,314,978 B2
(45) Date of Patent: May 27, 2025

(54) TARGETED ADVERTISEMENT RANKING USING MACHINE LEARNING

(71) Applicant: VIASAT, INC., Carlsbad, CA (US)

(72) Inventors: Alexandre Miguel Cachapuz Santos Fontoura, Dublin (IE); Arshiya Tripathy, Dublin (IE); Fiachra M. O'Donoghue, Cork (IE)

(73) Assignee: VIASAT INC., Carlsbad, CA (US)

( * ) Notice: Subject to any disclaimer, the term of this patent is extended or adjusted under 35 U.S.C. 154(b) by 0 days.

(21) Appl. No.: 18/113,323

(22) Filed: Feb. 23, 2023

(65) Prior Publication Data

US 2024/0289839 A1    Aug. 29, 2024

(51) Int. Cl.
*G06Q 30/00* (2023.01)
*G06Q 30/0251* (2023.01)

(52) U.S. Cl.
CPC ................ *G06Q 30/0251* (2013.01)

(58) Field of Classification Search
CPC ........................................... G06Q 30/02–0277
See application file for complete search history.

(56) References Cited

U.S. PATENT DOCUMENTS

| | | | |
|---|---|---|---|
| 7,593,934 B2 | 9/2009 | Li et al. |
| 7,734,633 B2 | 6/2010 | Liu et al. |
| 7,912,843 B2 | 3/2011 | Murdock et al. |
| 8,499,324 B1 | 7/2013 | Mitchell et al. |
| 9,734,722 B1 | 8/2017 | Markey et al. |
| 10,275,796 B2 | 4/2019 | Abuelsaad et al. |
| 10,482,559 B2 | 11/2019 | Djuric et al. |
| 11,205,196 B1 | 12/2021 | Raviv |
| 11,348,143 B2 | 5/2022 | Watson et al. |
| 2002/0178451 A1 | 11/2002 | Ficco |
| 2007/0156887 A1 | 7/2007 | Wright et al. |
| 2009/0010622 A1 | 4/2009 | Liu et al. |

(Continued)

FOREIGN PATENT DOCUMENTS

| | | |
|---|---|---|
| EP | 2634743 A1 | 9/2013 |
| KR | 20050098991 A | 10/2005 |

(Continued)

OTHER PUBLICATIONS

"Marketing Spot Optimization "ip.com Disclosure No. IPCOM000229301D Publicationdate: Jul. 19, 2013 (Year: 2013).*

(Continued)

*Primary Examiner* — Raquel Alvarez
(74) *Attorney, Agent, or Firm* — Vorys, Sater, Seymour and Pease LLP

(57) ABSTRACT

The present disclosure relates to ranking electronic advertisements using one or more machine learning algorithms for a targeted audience associated with an aircraft flight. For example, one or more embodiments described herein include a computer-implemented method comprising executing a learn-to-rank algorithm to train a machine learning model on a training dataset that includes electronic advertisements with associated scores characterizing a relevancy between the electronic advertisements and a defined query. The computer-implemented method can also comprise applying the trained machine learning model to rank a set of electronic advertisements based on a feature vector characterizing input data that includes flight details of an aircraft.

20 Claims, 6 Drawing Sheets

(56) References Cited

U.S. PATENT DOCUMENTS

| | | |
|---|---|---|
| 2010/0145765 A1 | 6/2010 | Kantarek |
| 2010/0190510 A1 | 7/2010 | Maranhas et al. |
| 2011/0313826 A1 | 12/2011 | Keen et al. |
| 2012/0232791 A1 | 9/2012 | Sterkel et al. |
| 2014/0075506 A1 | 3/2014 | Davis et al. |
| 2015/0356662 A1 | 12/2015 | Poole et al. |
| 2017/0161773 A1 | 6/2017 | Xu et al. |
| 2020/0111184 A1 | 4/2020 | Ly et al. |
| 2020/0202239 A1 | 6/2020 | Yussouff |
| 2020/0294530 A1 | 9/2020 | Cella |
| 2020/0334703 A1 | 10/2020 | Chang |
| 2020/0342040 A1 | 10/2020 | Adams et al. |
| 2021/0110428 A1 | 4/2021 | Twitter |
| 2021/0124466 A1 | 4/2021 | Hoang |
| 2021/0150609 A1 | 5/2021 | Ma et al. |
| 2021/0319033 A1 | 10/2021 | Zhang et al. |
| 2021/0390586 A1 | 12/2021 | Wai |
| 2022/0188861 A1 | 6/2022 | Kiladis et al. |
| 2023/0141874 A1 | 5/2023 | O'Brien et al. |

FOREIGN PATENT DOCUMENTS

| | | |
|---|---|---|
| WO | 2009097044 A1 | 8/2009 |
| WO | 2020069094 A1 | 4/2020 |
| WO | 2021/201831 A1 | 10/2021 |

OTHER PUBLICATIONS

International Search Report and Written Opinion of the International Searching Authority filed in the corresponding PCT Application PCT/US2024/011877; mailed Apr. 2, 2024; 11 pages.

Non-Final Office Action filed in corresponding U.S. Appl. No. 17/916,007; dated Aug. 17, 2023; 26 pages.

Final Office Action filed in corresponding U.S. Appl. No. 17/916,007; dated Jan. 22, 2024; 30 pages.

Non-Final Office Action filed in corresponding U.S. Appl. No. 17/916,007; dated Oct. 10, 2024; 53 pages.

Final Office Action filed in corresponding U.S. Appl. No. 17/916,007, dated Mar. 28, 2025, 45 pages.

* cited by examiner

TARGETED ADVERTISEMENT RANKING USING MACHINE LEARNING

TECHNICAL FIELD

The present disclosure relates generally to machine learning and electronic communication in aviation.

BACKGROUND

Aircraft are used to transport people and cargo across many countries and distances. Increasingly, aircraft can access data communication networks and provide digital content to passengers. For example, entertainment devices have been provided on airplanes to deliver digital content, such as, movies, television shows, weather data, map data, and other information to passengers. These entertainment devices have been provided on individual seat backs, walls or other surfaces on an airplane. Passengers also have been able to bring their own entertainment devices on an airplane for accessing a network to download, stream, or view digital content.

Targeted advertising is a form of advertising that focuses on delivering personalized offers to specified individuals or groups, rather than delivering offers to a wider audience via a generalized message. This is achieved by using data and algorithms to identify and reach potential customers who are most likely to be interested in a particular product or service.

Targeted advertising has become increasing prevalent in recent years due to the proliferation of data-gathering technologies and the growth of digital marketing channels. Online platforms such as social media, search engines, and e-commerce sites have made it easier for companies to collect data on their users' interests, behaviors, and/or demographics, which can then be used to deliver more relevant and effective advertising. Advantageously, targeted advertising can enable an entity (e.g., a company) to reach specific groups of consumers with greater precision and efficiency; thereby advertisements can be generated and/or selected so as to increase the probability that the audience will be interested in the offered product or service. Thus, targeted advertising can lead to higher conversion rates and more successful marketing campaigns.

Data communication for a network on an airplane can be provided through satellite links. Advertisements may be broadcast to all passengers at a time. Alternatively, different advertisements may be broadcast to different groups of passengers. Passengers on an airplane network are more remote and isolated compared to individuals accessing networks on other land-based networks. Public or anonymized data about a passenger on an airplane can be difficult to collect or gather. Data processing power and communication bandwidth on airplanes can also limit digital content provided in services to entertainment devices on a plane. As a result, targeted advertising with electronic advertisements on aircraft has been difficult.

SUMMARY

Computer-implemented methods, systems and computer program products for ranking electronic advertisements used in aviation are described. According to an embodiment consistent with the present disclosure, a computer-implemented method for ranking electronic advertisements is provided. The computer-implemented method can include: executing a learn-to-rank algorithm to train a machine learning model on a training dataset that includes electronic advertisements with associated scores characterizing a relevancy between the electronic advertisements and a defined query. The computer-implemented method can also include applying the trained machine learning model to rank a set of electronic advertisements based on a feature vector characterizing input data that includes flight details of an aircraft.

In another embodiment, a system is provided. The system can include a memory to store computer executable instructions. The system can also include one or more processors, operatively coupled to the memory, that execute the computer executable instructions to implement: a machine learning engine having a training stage and an inference stage. The inference stage can be configured to, based on at least one machine learning model, rank a set of electronic advertisements based on a feature vector characterizing input data that includes flight details of an aircraft.

In a further embodiment, computer program product for intelligent electronic advertisement ranking is provided. The computer program product can include a computer readable storage medium having computer executable instructions embodied therewith. The computer executable instructions can be executable by one or more processors to cause the one or more processors to execute a machine learning engine having a training stage and an inference stage. The inference stage can be configured to, based on a machine learning model implementing a learn-to-rank algorithm, rank a set of electronic advertisements in order of relevancy between electronic advertisements from the set of electronic advertisements and a feature vector characterizing input data that includes flight details of an aircraft.

This summary is not an extensive overview of the disclosure and is neither intended to identify certain elements of the disclosure, nor to delineate the scope thereof. Further embodiments, features, and advantages of the invention, as well as the structure and operation of the various embodiments of the invention are described in detail below with reference to accompanying drawings.

DETAILED DESCRIPTION

Figure 1:
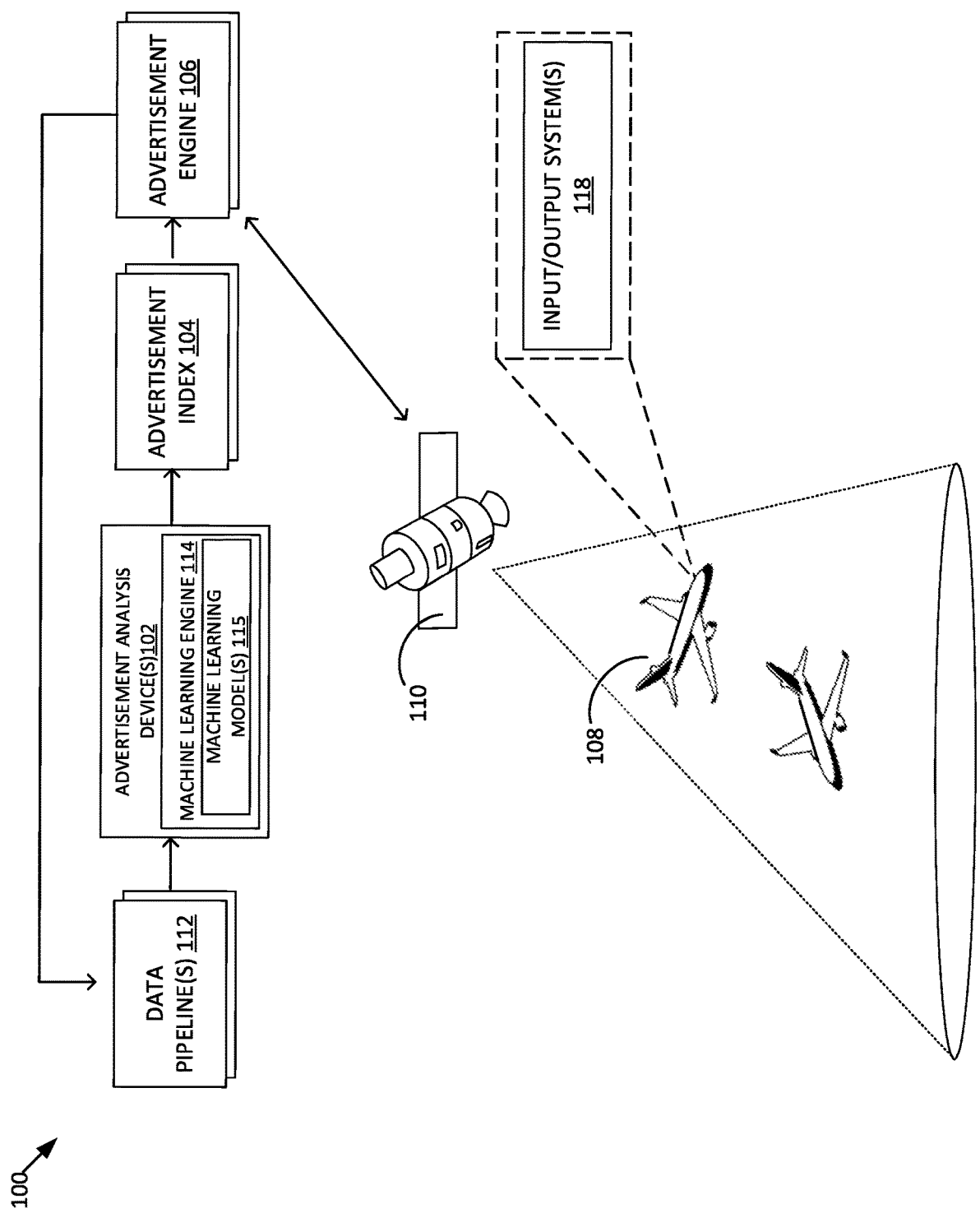
FIG. 1 illustrates a diagram of a non-limiting example system that can rank electronic advertisements for presentation on one or more aircraft using machine learning algorithms in accordance with one or more embodiments described herein.

The following detailed description is merely illustrative and not intended to limit the scope and/or use of embodiments. Furthermore, there is no intention to be bound by any expressed or implied information presented in the preceding Background or Summary sections, or in the following Detailed Description section.

One or more embodiments are now described with reference to the Drawings, where like referenced numerals are used to refer to like elements throughout. In the following Detailed Description, for purpose of explanation, numerous specific details are set forth in order to provide a more thorough understanding of the one or more embodiments. However, it is evident that one or more embodiments can be practiced without these specific details.

Embodiments refer to illustrations described herein with reference to particular applications. It should be understood that the present description is not limited to the embodiments. Those skilled in the art with access to the teachings provided herein will recognize additional modifications, applications, and embodiments within the scope there and additional fields in which the embodiments would be of significant utility.

Embodiments in accordance with the present disclosure generally relate to systems, computer-implemented methods, and/or computer program products that can apply one or more machine learning algorithms to rank electronic advertisements for presentation on one or more aircraft. For example, one or more machine learning engines described herein can apply learn-to-rank ("LTR") to train one or more machine learning models to rank electronic advertisements based on the advertisements' relevancy to input data. In one or more embodiments, the input data can include flight details regarding the aircraft and/or behavior data regarding one or more passengers of the aircraft.

One or more electronic advertisement rankings can be stored in one or more advertisement indexes accessible to an advertisement engine. In one or more embodiments, the advertisement engine can select electronic advertisements from the advertisement index for presentation on a flight based on the ranking. Further, the ranking can be updated while the aircraft is in transit based on one or more changes to: the input data defining the context of the target advertisement audience; and/or audience interaction history with one or more of the electronic advertisements being ranked. In one or more embodiments, the machine learning engine can be employed to perform the electronic advertisement ranking operations between operations of the advertisement engine and the advertisement index, such that the training and/or inference stages of the machine learning models can be executed without model integration with the advertising services.

Moreover, various embodiments described herein can constitute one or more technical improvements over conventional advertisement ranking operations by determining the ranking as a function of predicted relevancy between an electronic advertisement and the flight details of an aircraft and/or behavior data of passenger of the aircraft. Additionally, one or more embodiments described herein can have a practical application by training machine learning models to perform the ranking operations in accordance with defined advertisement objectives. For example, one or more embodiments described herein can control how the machine learning models are trained such that the electronic advertisements are ranked to optimize views of the advertisement, engagements with the advertisements, and/or revenue associated with the advertisements. For instance, the machine learning engine can be executed to generate multiple electronic advertisement rankings within the advertisement index, with each ranking generated by a machine learning model trained for a respective advertisement objective. Thereby, the advertisement engine can select electronic advertisements in accordance with respective rankings depending on the advertisement objective being implemented within the context of the given flight data and/or passenger behavior data.

As used herein, the term "machine learning" can refer to an application of artificial intelligence technologies to automatically and/or autonomously learn and/or improve from an experience (e.g., training data) without explicit programming of the lesson learned and/or improved upon. Machine learning as used herein can include, but is not limited to, deep learning techniques. Various system components described herein can utilize machine learning (e.g., via supervised, unsupervised, and/or reinforcement learning techniques) to perform tasks such as classification, regression, and/or clustering. Execution of machine learning tasks can be facilitated by one or more machine learning models trained on one or more training datasets in accordance with one or more model configuration settings.

As used herein, the term "machine learning model" can refer to a computer model used to facilitate one or more machine learning tasks (e.g., regression and/or classification tasks). For example, a machine learning model can represent relationships (e.g., causal or correlation relationships) between parameters and/or outcomes within the context of a specified domain. For instance, machine learning models can represent the relationships via probabilistic determinations that can be adjusted, updated, and/or redefined based on historic data and/or previous executions of a machine learning task. In various embodiments described herein, machine learning models can simulate a number of interconnected processing units that can resemble abstract versions of neurons. For example, the processing units can be arranged in a plurality of layers (e.g., one or more input layers, hidden layers, and/or output layers) connected by varying connection strengths (e.g., which can be commonly referred to within the art as "weights").

Machine learning models can learn through training with one or more training datasets; where data with known outcomes in inputted into the machine learning model, outputs regarding the data are compared to the known outcomes, and/or the weights of the machine learning model are autonomously adjusted based on the comparison to replicate the known outcomes. As the one or more machine learning models train (e.g., utilize more training data), the machine learning models can become increasingly accurate; thus, trained machine learning models can accurately analyze data with unknown outcomes, based on lessons learned from training data and/or previous executions, to facilitate one or more machine learning tasks.

Example types of machine learning models can include, but are not limited to: artificial neural network ("ANN") models, perceptron ("P") models, feed forward ("FF") models, radial basis network ("RBF") models, deep feed forward ("DFF") models, recurrent neural network ("RNN") models, long/short memory ("LSTM") models, gated recurrent unit ("GRU") models, auto encoder ("AE") models, variational AE ("VAE") models, denoising AE ("DAE") models, sparse AE ("SAE") models, markov chain ("MC") models, Hopfield network ("HN") models, Boltzmann machine ("BM") models, deep belief network ("DBN") models, convolutional neural network ("CNN") models, deep convolutional network ("DCN") models, deconvolutional network ("DN") models, deep convolutional inverse graphics network ("DCIGN") models, generative adversarial network ("GAN") models, liquid state machine ("LSM") models, extreme learning machine ("ELM") models, echo state network ("ESN") models, deep residual network ("DRN") models, kohonen network ("KN") models, support vector machine ("SVM") models, and/or neural turing machine ("NTM") models.

FIG. 1 illustrates a non-limiting example system 100 that employs one or more advertisement analysis devices 102 to intelligently rank electronic advertisements included in one or more advertisement indexes 104 accessible by one or more advertisement engines 106 in accordance with one or more embodiments described herein. In various embodiments, the advertisement engine 106 can present electronic advertisements from the advertisement index 104 to one or more users (e.g., passengers) located within one or more aircraft 108. For instance, FIG. 1 depicts an example embodiment in which the advertisement engine 106 is employed to deliver targeted advertisements to passengers located within one or more aircraft 108 via, for example, a satellite 110 communication. In one or more embodiments, the advertisement analysis devices 102 can utilize machine learning algorithms to rank electronic advertisements based on input data provided by one or more data pipelines 112, where the input data can characterize various aspects of the aircraft 108 and/or specific passengers of the aircraft 108.

As shown in FIG. 1, the one or more data pipelines 112 can be operably coupled to the one or more advertisement analysis devices 102, which can apply one or more machine learning engines 114 to rank available advertisements. While training a machine learning model 115 applied by the machine learning engine 114, input data supplied by the one or more data pipelines 112 can be utilized to generate training data. Subsequently, the data supplied by the one or more data pipelines 112 can be used as input data for the trained machine learning model 115 to implement one or more advertisement ranking operations. For example, the one or more advertisement analysis devices 102 can generate one or more electronic advertisement rankings based on the advertisements' relevance to one or more feature vectors extracted from the input data, which can include, but is not limited to: flight details regarding the one or more aircraft 108 (e.g., departure location and/or destination location of one or more aircraft), behavior data regarding one or more passengers of the one or more aircraft 108, a combination thereof, and/or the like. The electronic advertisements can be stored and/or managed by the one or more advertisement indexes 104, which can include the ranking determined by the one or more advertisement analysis devices 102.

Further, the one or more advertisement indexes 104 can be operably coupled to the one or more advertisement engines 106. In accordance with various embodiments describe herein, the one or more advertisement engines 106 can select one or more electronic advertisement from the one or more advertisement indexes 104 for presentation to one or more passengers of the aircraft 108. For instance, one or more input/output systems 118 (e.g., infotainment systems and/or mobile devices) on the aircraft 108 can receive the selected advertisement from the one or more advertisement engines 106 and present the advertisement to the passenger.

Where the passenger interacts (e.g., via the one or more input/output systems 118) with the presented advertisement, the advertisement engine 106 can collect event data from the one or more input/output systems 118 and supply the event data to the one or more data pipelines 112. For example, the event data can delineate: a number of audience engagements (e.g., clicks and/or impressions) solicited by the advertisement, the occurrence of an engagement of services (e.g., via the one or more input/output systems 118) offered by the advertisement, the occurrence of a purchase of a product (e.g., via the one or more input/output systems 118) offered by the advertisement, a combination thereof, and/or the like. In various embodiments, the event data can be utilized to further train the one or more machine learning models 115 applied by the machine learning engine 114.

In various embodiments, the one or more input/output systems 118 can be employed to enter interact with and/or view one or more electronic advertisements selected by the one or more advertisement engines 106. In various embodiments, the one or more input/output systems 118 can include and/or display one or more input interfaces (e.g., a user interface) to facilitate entry of data into the system 100 (e.g., to engage services and/or products offered by the electronic advertisements). Also, in one or more embodiments the one or more input/output systems 118 can be employed to display one or more outputs from the one or more advertisement engines 106.

The one or more input/output systems 118 can include one or more computer devices, including, but not limited to: desktop computers, servers, laptop computers, smart phones, smart wearable devices (e.g., smart watches and/or glasses), computer tablets, keyboards, touch pads, mice, augmented reality systems, virtual reality systems, microphones, remote controls, stylus pens, biometric input devices, a combination thereof, and/or the like. Additionally, the one or more input/output systems 118 can include one or more displays that can present one or more outputs generated by, for example, the advertisement engine 106. Example displays can include, but are not limited to: cathode tube display ("CRT"), light emitting diode display ("LED"), electroluminescent display ("ELD"), plasma display panel ("PDP"), liquid crystal display ("LCD"), organic light-emitting diode display ("OLED"), a combination thereof, and/or the like.

Figure 2:
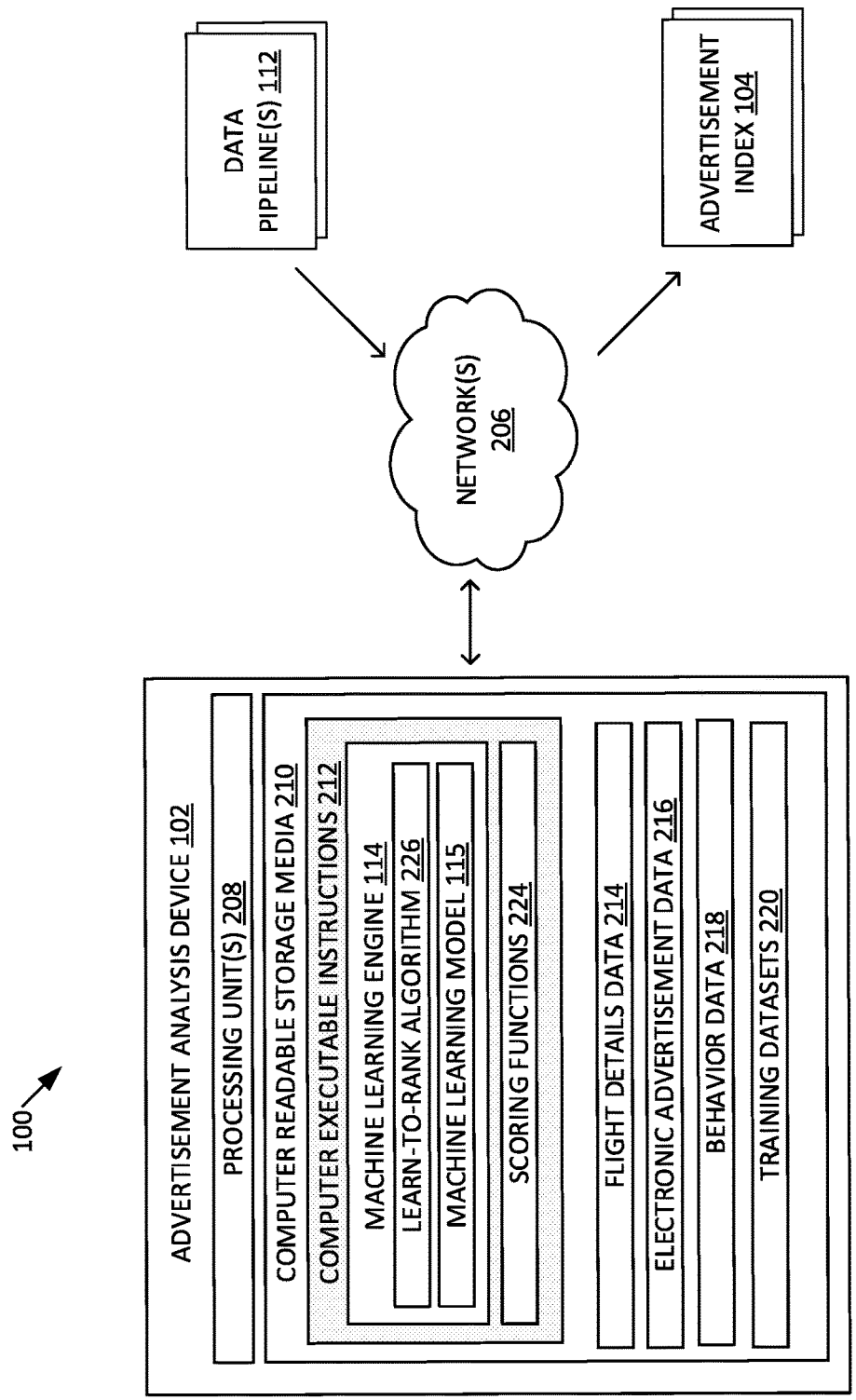
FIG. 2 illustrates a diagram of a non-limiting example system that can rank electronic advertisements using a machine learning engine that applies learn-to-rank algorithms to train machine learning models in accordance with one or more embodiments described herein.

FIG. 2 illustrates a non-limiting example of the one or more advertising analysis devices 102 comprising one or more machine learning engines 114 in accordance with one or more embodiments described herein. In various embodiments, the one or more advertising analysis devices 102 (e.g., a server, a desktop computer, a laptop, a hand-held computer, a programmable apparatus, a minicomputer, a mainframe computer, an Internet of things ("IoT") device, and/or the like) can be operably coupled to (e.g., communicate with) the one or more data pipelines 112 and/or advertisement indexes 104 via one or more networks 206.

As shown in FIG. 2, the one or more advertising analysis devices 102 can include one or more processing units 208 and/or computer readable storage media 210. In various embodiments, the computer readable storage media 210 can store one or more computer executable instructions 212 that can be executed by the one or more processing units 208 to perform one or more defined functions. In various embodiments, the one or more machine learning engines 114 can be computer executable instructions 212 and/or can be hardware components operably coupled to the one or more processing units 208. For instance, in some embodiments, the one or more processing units 208 can execute the machine learning engine 204 to perform various functions described herein (e.g., intelligently rank advertisements relevant to a given inquiry and/or input data characterizing targeted vehicles 108 and/or passengers). Additionally, the computer readable storage media 210 can store input data (e.g., flight details data 214, electronic advertisement data 216, and/or behavior data 218) and/or one or more training datasets 220.

The one or more processing units 208 can include any commercially available processor. For example, the one or more processing units 208 can be a general purpose processor, an application-specific system processor ("ASSIP"), an application-specific instruction set processor ("ASIPs"), or a multiprocessor. For instance, the one or more processing units 208 can include a microcontroller, microprocessor, a central processing unit, and/or an embedded processor. In one or more embodiments, the one or more processing units 208 can include electronic circuitry, such as: programmable logic circuitry, field-programmable gate arrays ("FPGA"), programmable logic arrays ("PLA"), an integrated circuit ("IC"), and/or the like.

The one or more computer readable storage media 210 can include, but are not limited to: an electronic storage device, a magnetic storage device, an optical storage device, an electromagnetic storage device, a semiconductor storage device, a combination thereof, and/or the like. For example, the one or more computer readable storage media 210 can include: a portable computer diskette, a hard disk, a random access memory ("RAM") unit, a read-only memory ("ROM") unit, an erasable programmable read-only memory ("EPROM") unit, a CD-ROM, a DVD, Blu-ray disc, a memory stick, a combination thereof, and/or the like. The computer readable storage media 210 can employ transitory or non-transitory signals. In one or more embodiments, the computer readable storage media 210 can be tangible and/or non-transitory. In various embodiments, the one or more computer readable storage media 210 can store the one or more computer executable instructions 212 and/or one or more other software applications, such as: a basic input/output system ("BIOS"), an operating system, program modules, executable packages of software, and/or the like.

The one or more computer executable instructions 212 can be program instructions for carrying out one or more operations described herein. For example, the one or more computer executable instructions 212 can be, but are not limited to: assembler instructions, instruction-set architecture ("ISA") instructions, machine instructions, machine dependent instructions, microcode, firmware instructions, state-setting data, configuration data, source code, object code, a combination thereof, and/or the like. For instance, the one or more computer executable instructions 212 can be written in one or more procedural programming languages. Although FIG. 2 depicts the computer executable instructions 212 stored on computer readable storage media 210, the architecture of the system 100 is not so limited. For example, the one or more computer executable instructions 212 can be embedded in the one or more processing units 208.

The one or more networks 206 can include one or more wired and/or wireless networks, including, but not limited to: a cellular network, a wide area network ("WAN"), a local area network ("LAN"), a combination thereof, and/or the like. One or more wireless technologies that can be included within the one or more networks 206 can include, but are not limited to: wireless fidelity ("Wi-Fi"), a WiMAX network, a wireless LAN ("WLAN") network, BLUETOOTH® technology, a combination thereof, and/or the like. For instance, the one or more networks 206 can include the Internet and/or the IoT. In various embodiments, the one or more networks 206 can include one or more transmission lines (e.g., copper, optical, or wireless transmission lines), routers, gateway computers, and/or servers. Further, the one or more advertisement analysis devices 102 can include one or more network adapters and/or interfaces (not shown) to facilitate communications via the one or more networks 206.

In various embodiments, the one or more data pipelines 112 can be one or more systems for extracting and/or processing data from various data warehouses, such as: short message service PostgreSQL ("SMS Postgres"). In various embodiments, the one or more data pipelines 112 can utilize a variety of tools and/or technologies such as Apache Beam, Apache Flink, Apache Spark, and/or the like to orchestrate data communication pathways that can handle data at scale and/or incorporate various type of data transformations. Thereby, the one or more data pipelines 112 can be employed by the system 100 to automate the process of moving and/or transforming input data to be analyzed by the one or more advertisement analysis devices 102.

For example, PostgreSQL is an open-source relational database management system that emphasizes extensibility and SQL compliance, which can be used by one or more data pipelines 112 as a data store and/or data warehouse for various web applications, mobile applications, geospatial applications, and/or the like. In various embodiments, SMS Postgres can incorporate SMS messaging services and Postgres functionality. In one or more embodiments, an SMS Postgres data warehouse can be utilized to collect and/or store flight details data 214, which can be shared and/or accessed by the one or more advertisement analysis devices 102. The flight details data 214 can include details regarding the one or more aircraft 108. Example information that can be included in the flight details data 214 can include, but is not limited to: flight numbers, flight schedules, the departure and destination locations and/or times of flights, the type of aircraft 108 making the flight (e.g., including the make, model, age, passenger capacity, cargo capacity, range, speed, and/or the like of the given aircraft 108), the number of passengers scheduled to travel via the flight, a combination thereof, and/or the like.

For instance, the flight details data 214 can include itinerary information such as: the geographic location at which the aircraft 108 begins a trip (e.g., departure location of a flight), a geographic location at which the aircraft 108 concludes a trip (e.g., landing location of a flight), dates of travel, a ticket purchase class (e.g., first class, business class, economy class), the occurrence of layovers in one or more cities other than the departure and/or destination locations, a combination thereof, and/or the like. As described further herein, in various embodiments the flight details data 214 can be updated in real time or near-real time. For instance, flight details data 214 characterizing a given flight can be updated while the flight is being performed. For instance, the flight details data 214 can be updated to characterize flight delays and/or a change to one or more layover destinations.

In one or more embodiment, the data pipeline 112 can further include one or more cloud-based data platforms, which can provide data warehousing, analytics, and/or data lake capabilities. Further, cloud-based data platform be designed to process structured and/or semi-structured data to support a wide range of workloads. In one or more embodiments, the cloud-based data platform can be incorporated into the one or more data pipelines 112, where tools such as SQL queries and/or analytics functions can be employed to analyze and/or interpret the data.

For example, cloud-based platforms of the one or more data pipelines 112 can be utilized to collect, process, and/or share electronic advertisement data 216, which can include, for instance, electronically store information ("ESI") such as metadata and/or event data. For example, the electronically advertisement data 216 can delineate a plurality of electronic advertisements available for presentation to passengers of the one or more aircraft 108. Each electronic advertisement can be associated with a unique identifier (e.g., a name of the advertisement and/or unique numerical identifier), metadata regarding target characteristics of the advertisement, and/or event data regarding historic audience interactions associated with the advertisement.

In one or more embodiments, the metadata included in the electronic advertisement data 216 can delineate one or more target characteristics (e.g., keywords) that describe the nature of the associated electronic advertisement. For example, the metadata can delineate a product being offered for sale by the associated electronic advertisement. In another example, the metadata can delineate a type and/or name of a service offered for sale by the associated electronic advertisement. In a further example, the metadata can delineate an expiration date for the associated electronic advertisement. In a still further example, the metadata can delineate a discount value offered by the associated electronic advertisement.

In one or more embodiments, the event data included in the electronic advertisement data 216 can delineate one or more historic audience interactions and/or views between the associated electronic advertisement and passengers of one or more previous flights of an aircraft 108. For example, the event data can delineate one or more flight details of a previous flight of the aircraft 108, where the associated electronic advertisement was presented to one or more passengers. Further, the event data can delineate how many passengers interacted with the associated electronic advertisement during the previous flight and/or the type of interaction. For instance, the event data can delineate how many times the passengers clicked on the associated electronic advertisement via the one or more input/output systems 118. In another instance, the event data can delineate the number of impressions (e.g., viewership) of the associated electronic advertisement over one or more previous flights. In a further instance, the event data can delineate how many service and/or product sales were correlated to the associated electronic advertisement (e.g., based on the passenger's traffic to a targeted website and/or interaction with a payment system).

In various embodiments, the input data supplied by the one or more data pipelines 112 can further include behavior data 218 associated with one or more passengers of the aircraft 108. For instance, the advertisement analysis device 102 can query the one or more data pipelines 112 for behavior data 218 associated with one or more passengers described in the flight details data 214. For example, the behavior data 218 can delineate the final destination of the associated passenger (e.g., where the passenger has one or more connecting flights during his/her travels). In another example, the behavior data 218 can delineate one or more past destinations travelled to by the associated passenger. In a further example, the behavior data 218 can delineate demographic information, shared by the associated passenger. In a still further example, the behavior data 218 can include a purchase history of products and/or services previously engaged by the associated passenger. In another example, the behavior data 218 can include an interaction history of electronic advertisements previously engaged by the associated passenger. In one or more embodiments, the behavior data 218 can delineate real-time, or near real-time, interactions between the associated passenger and one or more electronic advertisements being presented on the one or more aircraft 108. For example, the passenger's interaction with, or lack of interaction with, the one or more input/output systems 118 can be characterized by behavior data 218 (e.g., captured via the one or more satellites 110 and/or advertisement engine 106), which can be included in the input data supplied by the one or more data pipelines 112.

In one or more embodiments, the flight details data 214, electronic advertisement data 216, and/or behavior data 218 can include input data associated with a defined time period. For example, the advertisement analysis device 102 can query the one or more data pipelines 112 for input data from a defined duration (e.g., last three months), where the flight details data 214, electronic advertisement data 216, and/or behavior data 218 can be updated as new input data is supplied. Additionally, the advertisement analysis device 102 can apply one or more pre-processing techniques to the input data to render the flight details data 214, electronic advertisement data 216, and/or behavior data 218. For instance, the one or more pre-processing techniques can include, but are not limited to: inputting missing data, removing data outliers, balancing a dataset, transforming data, encoding data, a combination thereof, and/or the like. One or more example pre-processing techniques and/or algorithms employed by the advertisement analysis device 102 to process raw input data into the flight details data 214, electronic advertisement data 216, and/or behavior data 218 can include, but are not limited to: data cleaning (e.g., removing invalid, incomplete, or irrelevant data), data transformation (e.g., altering the data format and/or normalizing numerical values), data reduction (e.g., reducing the dimensionality of the data), a combination thereof, and/or the like.

In various embodiments, the machine learning engine 114 can sample the flight details data 214, electronic advertisement data 216, and/or behavior data 218 to generate one or more training datasets 220. The training datasets 220 can include, for example, an ordered list of electronic advertisements (e.g., characterized by electronic advertisement data 216, including unique identifiers for each electronic advertisement) with associated relevancy scores. For example, the machine learning engine 114 can extract one or more feature vectors from the flight details data 214 and/or the behavior data 218 and compute a relevancy score based on the extracted feature vector. The relevancy score can characterize an amount relevancy between a given electronic advertisement and the one or more extracted feature vectors. For instance, the feature vector can regard a previous flight destination of the one or more aircraft 108, and the relevancy score can characterize amount of relevancy between each electronic advertisement in the training dataset 220 and the previous flight destination.

In one or more embodiments, the relevancy score can be computed in accordance with one or more scoring functions 224. As shown in FIG. 2, the one or more scoring functions 224 can be included in the one or more computer executable instructions 212. For example, the machine learning engine 114 can compute the relevancy scores in accordance with the scoring function 224 to generate the one or more training datasets 220. In another example, one or more subject matter experts can compute the relevancy scores (e.g., in accordance with the scoring function 224) and enter the relevancy scores into the system 100 to populate the one or more training datasets 220.

In various embodiments, the scoring function 224 can define the relevancy score as a function of historic audience interactions and/or viewership of the electronic advertisements. For example, the historic audience interactions (e.g., clicks) and/or viewership (e.g., impressions) can be defined by the event data of the electronic advertisement data 216. In another example, the historic audience interactions (e.g., clicks) and/or viewership (e.g., impressions) can be defined by the behavior data 218 for an associated passenger characterized and/or defined by the one or more extracted feature vectors. Additionally, the scoring function 224 can include one or more weighted metrics for audience interactions that resulted in an engagement of a service offered by the associated electronic advertisement and/or a purchase of a product offered by the associated electronic advertisement. For example, the weighted metric can be utilized by the scoring function 224 to enable interactions with the electronic advertisement (e.g., clicks of the advertisement) that resulted in the engagement and/or purchase of a product and/or service offered by the electronic advertisement to have a greater contribution to the electronic advertisement's relevancy determination than: interactions that did not result in a subsequent engagement and/or purchase; and/or impressions that did not result in an interaction (e.g., click) other than viewership. In accordance with various embodiments described herein, the scoring function 224 can be defined based on one or more goals of a given advertisement campaign (e.g., an advertisement objective). For example, the scoring function 224 can be defined so as to compute relevancy in a context that prioritizes: viewership (e.g., impressions) of the electronic advertisements, interaction (e.g., clicks) of the electronic advertisements (e.g., prioritizing the generation of traffic to a target website), and/or revenue from offers included in the electronic advertisement (e.g., prioritize the engagement of services and/or purchase of products).

For example, in one or more embodiments the scoring function 224 can be defined in accordance with Equation 1.

$$f(s) = \frac{\text{click}}{\text{viewable impressions}} \times w_{activations} \quad (1)$$

$$w_{activations} = 2 \text{ if activations}$$

$$w_{activations} = 1 \text{ if no activations}$$

Where "f(s)" represents the relevancy score, "click" represents an audience (e.g., passenger) interaction with the associated electronic advertisement, "view impression" represents an audience (e.g., passenger) viewership of the associated electronic advertisement, and "$w_{activations}$" represents an interaction resulting in engagement of a service and/or purchase of a product offered by the electronic advertisement (e.g., the $w_{activations}$ can service as a weighted metric). As described herein, alternate scoring functions 224 (e.g., alternate to Equation 1) can be employed by the machine learning engine 114 and/or a subject matter expert to compute the relevancy scores included in the one or more training datasets 220.

In one or more embodiments, the relevancy score can be computed based on one or more feature vectors extracted from the flight details data 214 (e.g., a departure and/or destination location and/or a passenger of a scheduled flight) and/or behavior data 218. Further, the relevancy score can be computed based on audience interactions, views, and/or activations defined by the electronic advertisement data 216 and/or the behavior data 218.

For example, the feature vector upon which the relevancy scores are based can be extracted from the flight details data 214 and the audience interaction and/or viewership can be defined by the event data of electronic advertisement data 216. For instance, the feature vector can delineate a target flight destination, where the scoring function can be computed based on the number of "clicks", "viewable impressions" and/or "weighted activations" associated with the given electronic advertisement during past flights having the same flight destination as the target flight destination and/or a flight destination in proximity to the target flight destination (e.g., as defined by the metadata and/or event data of the electronic advertisement data 216).

In another example, the feature vector can be extracted from the flight details data 214 and the audience interaction and/or viewership can be defined by the behavior data 218 and/or the electronic advertisement data 216. For example, the feature vector can delineate a passenger scheduled to attend a flight and/or currently attending a flight, where the scoring function can be computed based on the number of "clicks", viewable impressions" and/or weighted activations" previously occurring between the passenger and the given electronic advertisement (e.g., as defined by the behavior data 218), or an electronic advertisement that shares one or more target characteristics defined in the advertisement metadata.

Figure 3:
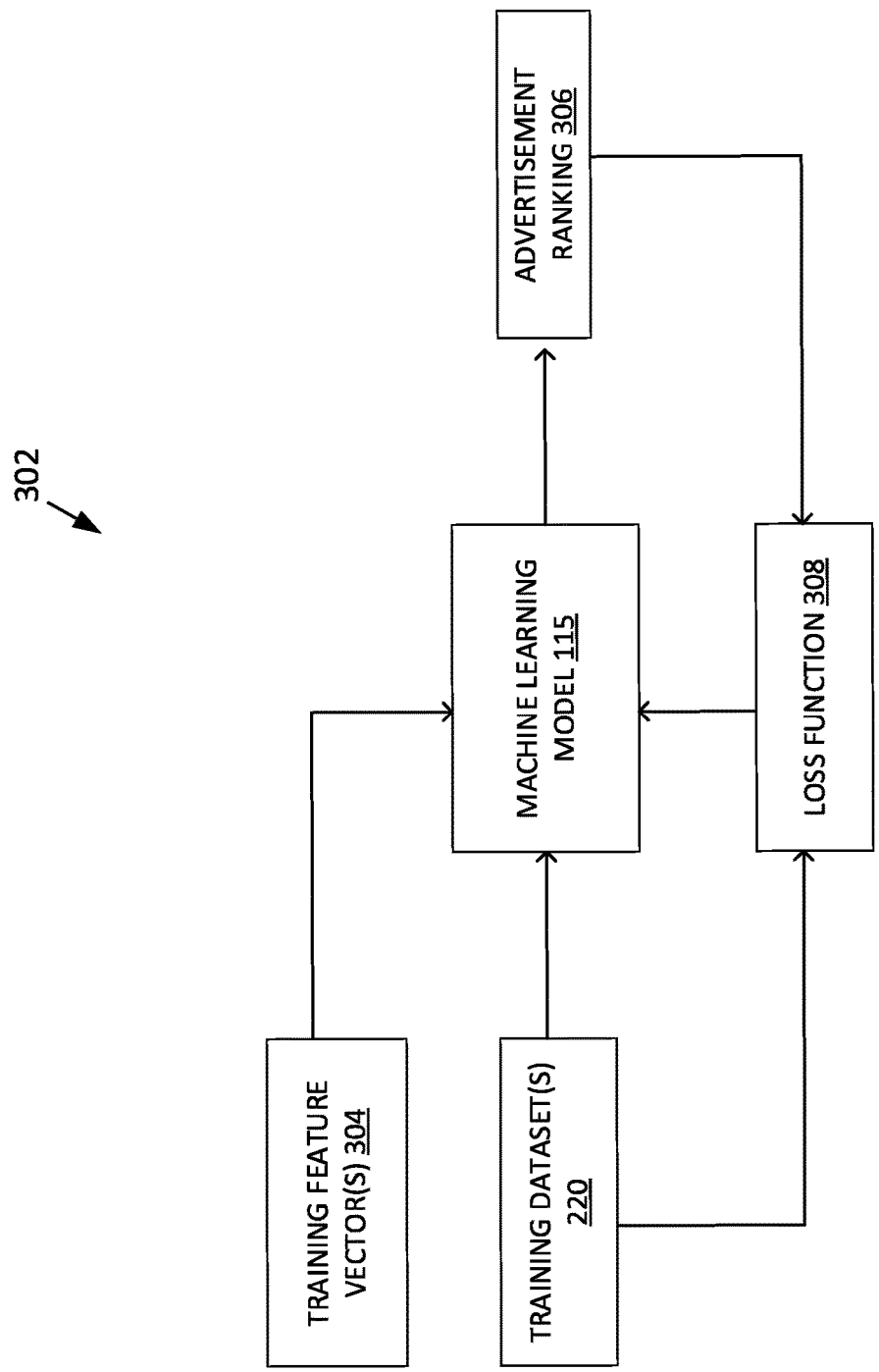
FIG. 3 illustrates a diagram of a non-limiting example training stage, where machine learning models can be trained to rank electronic advertisements based on one or more optimization objectives in accordance with one or more embodiments described herein.

FIG. 3 illustrates a diagram of the non-limiting example machine learning engine 114 during a training stage 302 in accordance with one or more embodiments described herein. During the training stage 302, the machine learning engine 114 can execute one or more supervised learning and/or reinforcement learning techniques to train the one or more machine learning models 115 based on the one or more training datasets 220 and associated training feature vectors 304 to perform one or more advertisement ranking operations.

As described herein, the training datasets 220 can included one or more ordered list of electronic advertisements and associated relevancy scores. The relevancy scores can be based on the one or more training feature vectors 304, and can be computed in accordance with the one or more scoring functions 224 by the machine learning engine 114 and/or a subject matter expert. The one or more training feature vectors 304 can be extracted from the flight details data 214 and/or the behavior data 218. For instance, the one or more training feature vectors 304 can characterize a flight of the one or more aircraft 108 and/or a passenger of the one or more aircraft 108. In various embodiments, the training datasets 220 can include training data (e.g., comprising electronic advertisement data 216 and associated relevancy scores) arranged into groups based on the query (e.g., defined via feature vector extracted from the input data) used to define the context of the relevancy score computation. For example, a given electronic advertisement can be characterized by two or more respective relevancy scores and can be included in two or more respective groups based on two or more respective feature vectors used to provide context to the relevancy score computations. For example, the training dataset 220 can include a first group associated with a first training feature vector 304, where the training data of the first group includes electronic advertisement data 216 with associated relevancy scores that were computed based on the first training feature vector 304. For instance, where the first training feature vector 304 is a scheduled flight destination (e.g., Chicago), the training data of the first group can include electronic advertisement data 216 with associated relevancy scores (e.g., computer in accordance with the scoring function 224) that characterize the electronic advertisements' relevancy to the scheduled flight destination (e.g., Chicago). Further, the training dataset 220 can include a second group associated with a second training feature vector, where the training data of the second group includes electronic advertisement data 216 with associated relevancy scores that were computed based on the second training feature vector 304. For instance, where the second training feature vector 304 defines and/or characterizes a passenger scheduled to board the aircraft 108, the training data of the second group can include electronic advertisement data 216 with associated relevancy scores (e.g., computed in accordance with the scoring function 224) that characterize the electronic advertisements' relevancy to the passenger.

In one or more embodiments, the same training feature vector 304 can be used in a series of ranking iterations by the machine learning model 115 performed during the training stage 302. Further, the machine learning engine 114 can segment each group of the training dataset 220 into a plurality of subsets for training, validation, and/or test iterations during the training stage 302. For example, the series of ranking iterations can be initialized by applying a first subset of the training dataset 220 to the one or more machine learning models 115, where the first subset includes the electronic advertisement data 216-relevancy score parings. Further, the first subset includes training data from the grouping within the training dataset 220 associated with the training feature vector 304 being utilized for the series of ranking iterations.

The machine learning model 115 can analyze the electronic advertisement-relevancy score pairings of the first subset to determine correlations between the electronic advertisement data 216 and the training feature vector based on the relevancy score. For example, the one or more machine learning models 115 can execute one or more learn-to-rank ("LTR") algorithms 226 to perform the ranking operations. The one or more LTR algorithms 226 can be a supervised machine learning algorithm that may also be used in semi-supervised and/or reinforcement learning problems to predict the ranking of a set of items (e.g., electronic advertisements) in order of relevancy to a query (e.g., defined via a feature vector). For example, the one or more training feature vectors 304 can serve as a defined query for the one or more LTR algorithms 226. In various embodiments, the one or more LTR algorithms 226 can utilize a pointwise, pairwise, or listwise approach to perform the ranking operations. The pointwise approach can focus on independent electronic advertisement and relevancy score combinations, where the ranking operation can be approximated to a regression problem. The pairwise approach can focus on electronic advertisement and relevancy score combination as pairs. The listwise approach can focus on solving the LTR problem, where the machine learning model 115 considers optimal ordering of a list of electronic advertisements.

For example, the machine learning model 115 can learn one or more correlations between features of an electronic advertisement and the training feature vector based on the associated relevancy score to predict the relevancy of another electronic advertisement to the same feature vector or a similar feature vector. Features of the electronic advertisements included in the training dataset 220 can be characterized by the metadata and/or event data of the electronic advertisement data 216 in accordance with one or more embodiments described herein. For instance, here electronic advertisements associated with high relevancy scores share common features, the machine learning model 115 can learn to correlate the shared features as an indication of high relevancy to the associated one or more feature vectors. Similarly, where electronic advertisements associated with low relevancy scores share common features, the machine learning model 115 can learn to correlate the shared features as an indication of low relevancy to the associated one or more feature vectors. In another instance, where an electronic advertisement associated with a high relevancy score has a feature not shared by electronic advertisements associated with lower relevancy scores, the machine learning model 115 can learn to correlate the unshared feature as an indication of high relevancy to the associated one or more feature vectors. Similarly, where an electronic advertisement associated with a low relevancy score has a feature not shared by electronic advertisements associated with higher relevancy scores, the machine learning model 115 can learn to correlate the unshared feature as an indication of low relevancy to the associated one or more feature vectors.

Thus, for a given training feature vector 304, the machine learning model 115 can be trained by the LTR algorithm 226 on the first subset of the training dataset 220 sourced from a grouping of training data that has relevancy scores computed based on the training feature vector 304. Further, the machine learning model 115 can be trained via a second iteration of the ranking operation, where a second subset of the training dataset 220 is applied to the machine learning model 115 with the same training feature vector 304. In one or more embodiments, the second subset does not include the associated relevancy scores. Also, the second subset can also include training data from the same grouping as the first subset (e.g., based on the training feature vector 304 for the given series of ranking iterations). Based on the correlations determine by execution of the LTR algorithm 226 on the first subset, the machine learning model 115 can rank the electronic advertisements of the second subset of the training dataset 220 to generate the advertisement ranking 306.

Additionally, the machine learning engine 114 can apply one or more loss functions 308 to analyze the accuracy of the advertisement ranking 306 in comparison to the relevancy scores of the second subset of the training dataset 220. For example, the machine learning engine 114 can apply a normalized discounted cumulative gain ("NDCG") algorithm as the loss function 308 to measure the quality of the advertisement ranking 306. Based on the measured loss (e.g., computed in accordance with the loss function 308), the machine learning engine 114 can tune one or more parameters of the machine learning model 115. For example, the machine learning engine 114 can tune the one or more parameters to reduce and/or minimize the amount of loss. For example, the parameter tuning can involve changing weights associated with nodes in layers of the one or more machine learning models 115 over multiple iterations until an expected advertisement ranking 306 is achieved for given subset of training data. In another example, machine learning model 115 parameters that can be tuned include the number of estimators, learning rate, and/or maximum depth parameters.

Subsequently, another ranking iteration in the series of ranking operations utilizing the given feature vector 304 can be performed by the machine learning model 115 on a third subset of the training dataset 220. In one or more embodiments, the third subset can also include electronic advertisements advertisement data 216 without the associated relevancy scores. The machine learning model 115 can generate another advertisement ranking 306, which ranks the electronic advertisements characterized by the third subset. The quality of the subsequent advertisement ranking 306 (e.g., of the third subset) can be measured in accordance with the loss function 308, and one or more parameters of the machine learning model 115 can again be tuned to reduce and/or minimize the computed loss. Thereby, through a series of ranking iterations for the given training feature vector 304 and associated group in the training dataset 220, the machine learning engine 114 can optimize the parameters of the one or more machine learning models 115 during the training stage 302. For example, the parameters can be optimized to perform ranking operations that prioritize advertisement campaign objects based on how the scoring function and/or loss function are defined. While a series of three ranking iterations are described above, embodiments comprising more iterations for a given training feature vector 304 are also envisaged.

Thus, in accordance with one or more embodiments described herein, the training stage 302 can utilize one or more LTR algorithms 124 to train layers of the one or more machine learning models 115. In various embodiments, supervised and/or unsupervised learning can be used to change weights to minimize the loss function 308. In one or more embodiments, reinforcement learning can be used to change weights to maximize a reward function. In further examples, activation functions, such as a sigmoid function, may also be used especially after layers with weights. Data fitting or regularization techniques to achieve a balanced machine learning model 115 and avoid undesired overfitting or underfitting can also be used. Additionally, further optimizations may be employed to improve training, such as, expanding the training dataset 220 with augmentation, increasing training time or the depth (or width) of the machine learning model 115, adding regularization, or increasing hyperparameter tuning as would be apparent to person skilled in the art given this description.

During the training stage 302, multiple series of ranking iterations can be performed for a plurality of training feature vectors 304, thereby training data from a plurality of groupings in the training datasets 220 can be applied during the training stage 302. Additionally, during the training stage 302, the machine learning engine 114 can train a plurality of respective machine learning models 115 having, for example, different software architectures. Further, the during the training stage 302, the machine learning engine 114 can train a plurality of machine learning models 115 on respective LTR algorithms 124. For example, one or more first machine learning models 115 can be trained using an LTR algorithm 124 that implements a pairwise approach, while one or more second machine learning models 115 can be trained using an LTR algorithm 124 that implements a listwise approach.

In one or more embodiments, the machine learning engine 114 can execute the training stage via online or offline operations. For example, the machine learning engine 114 can execute the training stage 302 via offline operations, where the training datasets 220 include only historic training data. In another example, the machine learning engine 114 can execute the training stage 302 via online operations, where the training datasets 220 include real-time, or near real-time, training data (e.g., where the advertisement analysis device 102 makes real-time, or near real-time, calls to the data pipelines 112 to collect updated input data).

Figure 4:
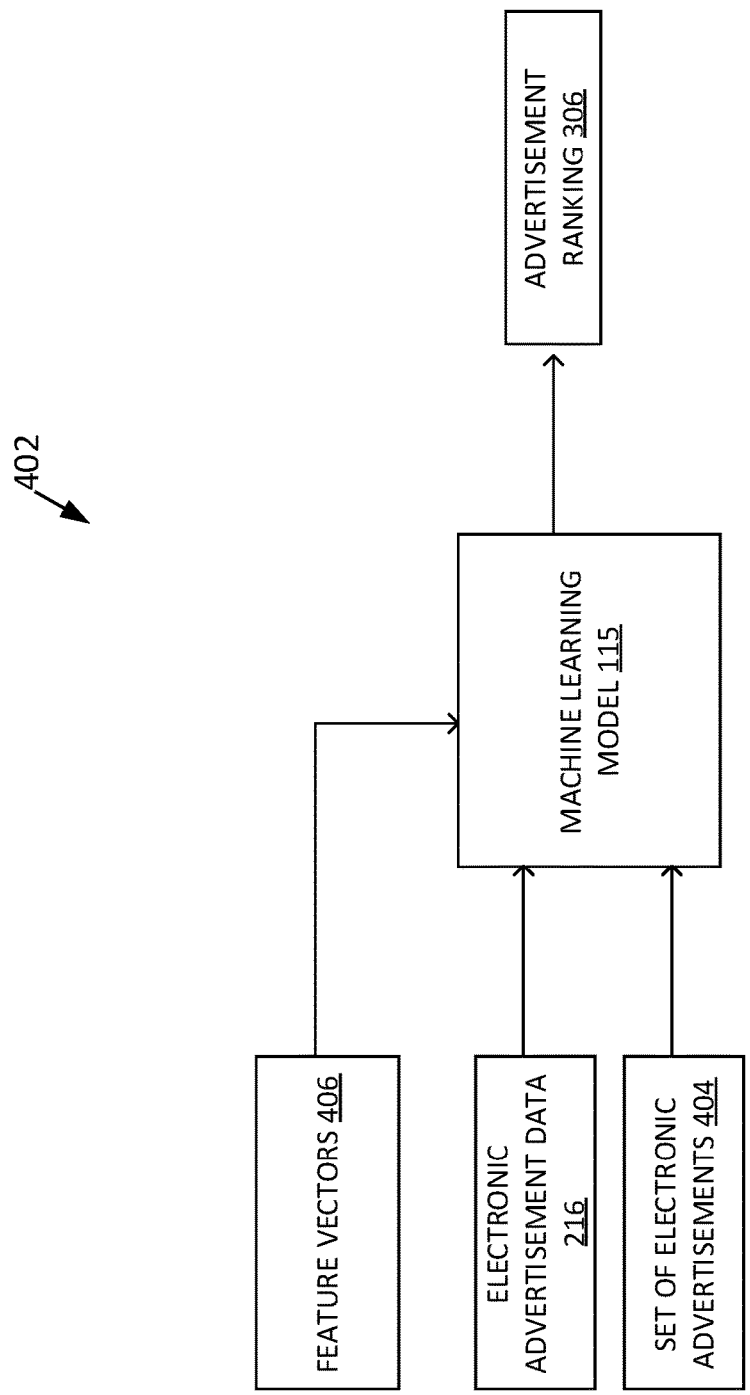
FIG. 4 illustrate a diagram of a non-limiting example inference stage, where trained machine learning models can be applied to rank electronic advertisements based on one or more optimization objectives in accordance with one or more embodiments described herein.

FIG. 4 illustrates a diagram of the non-limiting example machine learning engine 114 during an inference stage 402 in accordance with one or more embodiments described herein. During the inference stage 402, the machine learning engine 114 can apply the one or more trained machine learning models 115 to rank a set of electronic advertisements 404 based on electronic advertisement data 216 characterizing the set of electronic advertisements 404 and/or one or more feature vectors 404 characterizing input data from the one or more data pipelines 112. For example, the one or more feature vectors 406 can characterize attributes from the flight data 214 (e.g., flight departure and/or destination locations) and/or behavior data 218 (e.g., a passenger profile).

In one or more embodiments, the set of electronic advertisements 404 can be a subset from a pool of available electronic advertisements, where the machine learning engine 114 can apply one or more advertisement filters to the pool of available electronic advertisements to derive the set of electronic advertisements 406. For example, the advertisement filters can be applied via a rule-based approached as a function of the one or more feature vectors 404. In one or more embodiments, the advertisement engine 106 can define one or more filters and/or rules to be applied by machine learning engine 114. For example, the electronic advertisement data 216 can be associated with a pool of electronic advertisements, where the advertisement engine 106 can define a query and/or filter that results in the set of electronic advertisements 404 when applied by the machine learning engine 114. In one or more embodiments, the queries, filters, and/or rules set by the advertisement engine 106 to define the set of electronic advertisements 404 can be shared with the one or more advertisement analysis devices 102 via, for example, the one or more data pipelines 112 and/or networks 206.

For instance, the pool of advertisements may include active advertisements and paused advertisement (e.g., where active versus paused status can be based on the payment status of an account associated with the advertisements and/or can be designated by an owner of the advertisements), where the advertisement engine 106 can update the status of the electronic advertisements and query the machine learning engine 114 to define the set of electronic advertisements 404 to be ranked as only currently active electronic advertisements. In another instance, the advertisement engine 106 can query the machine learning engine 114 to define the set of electronic advertisements 404 to be ranked as only those electronic advertisements having a defined format and/or structure (e.g., only those electronic advertisements formatted to present images in a carousel format, or only those electronic advertisements that include a video). In a still further instance, the advertisement engine 106 can query the machine learning engine 114 to define the set of electronic advertisements 404 to be ranked as only those electronic advertisements generated after a defined date (e.g., thereby establishing an expiration date for the electronic advertisements to be ranked).

In one or more embodiments, the machine learning engine 114 can utilize the one or more machine learning models 115 to generate an advertisement ranking 306 of the set of electronic advertisements 406 for a given feature vector 406, where the set of electronic advertisements 404 can be characterized and/or defined by the electronic advertisement data 216. In various embodiments, the electronic advertisements of the set of electronic advertisements 406 can be characterized by little, or no, historic event data associated with the feature vector 406. For instance, the set of electronic advertisements 404 can lack event data that defines a historic correlation to the feature vector 406; thereby inhibiting a relevancy score computation. However, the trained machine learning model 115 can predict an amount of relevancy between the set of electronic advertisements 404 and the feature vector 406 based on correlations learned during the training stage 302, despite a lack of historic data between the feature vector 406 and set of electronic advertisements 404 (e.g., characterized by the electronic advertisement data 216).

In one or more embodiments, the machine learning engine 114 can apply a plurality of machine learning models 115 during the inference stage 402. For example, the machine learning engine 114 can apply an ensemble of machine learning model 115 trained by one or more LTR algorithms 226 in accordance with the various embodiments described herein. Additionally, respective machine learning models 115 of the ensemble can be trained with respective LTR algorithms 226. For example, a first machine learning model 115 of the ensemble can be trained via an LTR algorithm 226 that utilizes a pairwise approach; while a second machine learning model 115 of the ensemble can be trained via an LTR algorithm 226 that utilizes a listwise approach.

In one or more embodiments, the machine learning engine 114 can apply a plurality of feature vectors 406 for a ranking operation. For example, the relevancy of the electronic advertisements of the set of the electronic advertisements 404 can be predicted in relation to a combination of feature vectors 406. In some instances, the respective feature vectors 406 can be weighed the same with regards to the relevancy prediction. In other instances, a first feature vector 406 can be prioritized more heavily than a second feature vector 406 with regards to the relevancy prediction for ranking the set of electronic advertisements 404.

Further, the inference stage 402 can be performed on historic data and/or in real-time, or near real-time. For example, the inference stage 402 can be performed prior to the start of an aircraft's 108 flight that is characterized by the flight details data 214 to generate an initial advertisement ranking 306. During the course of the aircraft's 108 flight, the advertisement analysis device 102 can make one or more calls to the one or more data pipelines 112 to retrieve updated input data. Where the updated input data regards one or more of the feature vectors 406 upon which the ranking operation is based, the machine learning engine 114 can update the feature vector 406 (e.g., extract a new feature vector 406 from the updated input data) and re-perform the ranking operation to generate an updated advertisement ranking 306 while the aircraft 108 is in transit.

For instance, while the aircraft 108 is in transit, the destination of the aircraft 108 may change, where the changed destination can be reflected in the updated flight details data 214 and thereby the updated advertisement ranking 306. In another instance, while the aircraft 108 is in transit, a passenger's connecting flight may have been substantially delayed, where the duration of the layover can be reflected in the updated behavior data 218 and thereby the updated advertisement ranking 306. In a further instance, while the aircraft 108 is in transit, a passenger may engage one or more of the presented advertisements, where the advertisement's latest audience interactions and/or viewership can be reflected in the electronic advertisement data 216 and thereby the updated advertisement ranking 306.

In various embodiments, the advertisement ranking 306 can be stored in the one or more advertisement indexes 104. Further, the one or more advertisement engines 106 can select one or more electronic advertisements from the advertisement indexes 104 for presentation on the one or more input/output systems 118 of the aircraft 108 based on the advertisement ranking 306. For example, the one or more advertisement indexes 104 can include a plurality of advertisement rankings 306 associated with different queries (e.g., different feature vectors 406). In one or more embodiments, the one or more advertisement engines 106 can reference respective advertisement rankings 306 included in the advertisement indexes 104 based on the given query (e.g., based on a feature vector 406 that characterizes flight details and/or passenger profiles targeted by the given advertisement campaign).

In another example, the one or more advertisement indexes 104 can include a plurality of advertisement rankings 306 associated with different advertisement objectives. For instance, respective machine learning models 115 can be trained by the machine learning engine 114 to rank advertisements in accordance with respective advertisement objectives by utilizing respective training datasets 220 developed using respective scoring functions 224. For example, a first scoring function 224 can quantify relevancy such that engagement with the advertisement is prioritized in accordance with a first advertisement objective. Further, a second scoring function 224 can quantify relevancy such that sales revenue associated with the advertisement is prioritized in accordance with a second advertisement objective. One or more first training datasets 220 can be generated using the first scoring function to train one or more first machine learning models 115 during the training stage 302. Thereby, the one or more first machine learning models 115 can generate one or more first advertisement rankings 306 during the inference stage 402, in which electronic advertisements are ranked in accordance with the first advertisement objective (e.g., trained to rank electronic advertisements based on predicted engagement with the target advertisement audience and/or context). Also, one or more second training datasets 220 can be generated using the second scoring function to train one or more second machine learning models 115 during the training stage 302. Thereby, the one or more second machine learning models 115 can generate one or more second advertisement rankings 306 during the inference stage 402, in which electronic advertisements are ranked in accordance with the second advertisement objective (e.g., trained to rank electronic advertisements based on predicted revenue). Where the advertisement engine 106 is employed to select electronic advertisements based on the first advertisement objective, the advertisement engine 106 can select electronic advertisements based on the first advertisement ranking 306. Where the advertisement engine 106 is employed to select electronic advertisements based on the second advertisement objective, the advertisement engine 106 can select electronic advertisements based on the second advertisement ranking 306.

In one or more embodiments, the advertisement engine 106 can select electronic advertisements from the advertisement index 104 to fill multiple presentation slots in media being presented to one or more passengers of the aircraft 108. Further, one or more of the presentation slots may be prioritized above other presentation slots. For example, where the content of a first presentation slot would be presented prior to the content of a second presentation slot, the first presentation slot may be prioritized. Where presentation slots are prioritized, the advertisement engine 106 can select electronic advertisements to fill the presentation slots based on the advertisement ranking 306, where electronic advertisements associated with the greatest amount of relevance to given query (e.g., the given input data characterized by the feature vector 406) can be selected for the presentation slots with the highest priority.

Additionally, in one or more embodiments the advertisement engine 106 can select different electronic advertisements for presentation on different input/output systems 118 from different advertisement rankings 306 stored in the advertisement index 104 for the same flight of the aircraft 108. For example, one or more feature vectors 406 utilized to generate a first advertisement ranking 306 can characterize a first boarding group of the aircraft 108 (e.g., business class seating) and one or more feature vectors 406 utilized to generate a second advertisement ranking 306 can characterize a second boarding group of the aircraft 108 (e.g., economy class seating). Where a first set of the input/output systems 118 are configured to present media to the first boarding group (e.g., are located within the business class seating), the advertisement engine 106 can select electronic advertisements from the first advertisement ranking 306 for presentation by the first set of input/output systems 118 for a given flight. Where a second set of the input/output systems 118 are configured to present media to the second boarding group (e.g., are located within the economy class seating), the advertisement engine 106 can select electronic advertisements for presentation by the second set of input/output systems 118 for the given flight.

In another example, one or more feature vectors 406 utilized to generate a first advertisement ranking 306 can characterize a first passenger (e.g., a first passenger profile) and one or more feature vectors 406 utilized to generate a second advertisement ranking 306 can characterize a second passenger (e.g., second passenger profile) of the aircraft 108. Where a first set of the input/output systems 118 are configured to present media to the first passenger (e.g., are located adjacent to the assigned seat of the first passenger), the advertisement engine 106 can select electronic advertisements from the first advertisement ranking 306 for presentation by the first set of input/output systems 118 for a given flight. Where a second set of the input/output systems 118 are configured to present media to the second passenger (e.g., are located adjacent to the assigned seat of the second passenger), the advertisement engine 106 can select electronic advertisements for presentation by the second set of input/output systems 118 for the given flight.

In one or more embodiments, the advertisement engine 106 can select the electronic advertisements based on one or more historic advertisement rankings 306. For example, where the input data and/or one or more feature vectors defining a target advertisement audience and/or context are the same or similar to input data and/or feature vectors previously employed to rank the set of electronic advertisements 404 if interest, the advertisement engine 106 can select the electronic advertisements in accordance with the resultant advertisement ranking 306 previously generated by the machine learning engine 114. Further, the machine learning engine 114 can periodically, or continuously, update the historic advertisement ranking 306 as the new electronic advertisement data 216 is collected regarding the set of electronic advertisements 404.

Alternatively, the advertisement engine 106 can instruct the advertisement analysis device 102 to generate a new advertisement ranking 306 from which to base the electronic advertisement selection. For example, the advertisement engine 106 can define new input data (e.g., flight details data 214 and/or behavior data 218), not previously analyzed by the machine learning engine 114, to govern one or more ranking operations. In another example, the advertisement engine 106 can define new filters, queries, and/or rules to define a new set of electronic advertisements 404, not previously analyzed by the machine learning engine 114, from which to perform the ranking operations.

Figure 5:
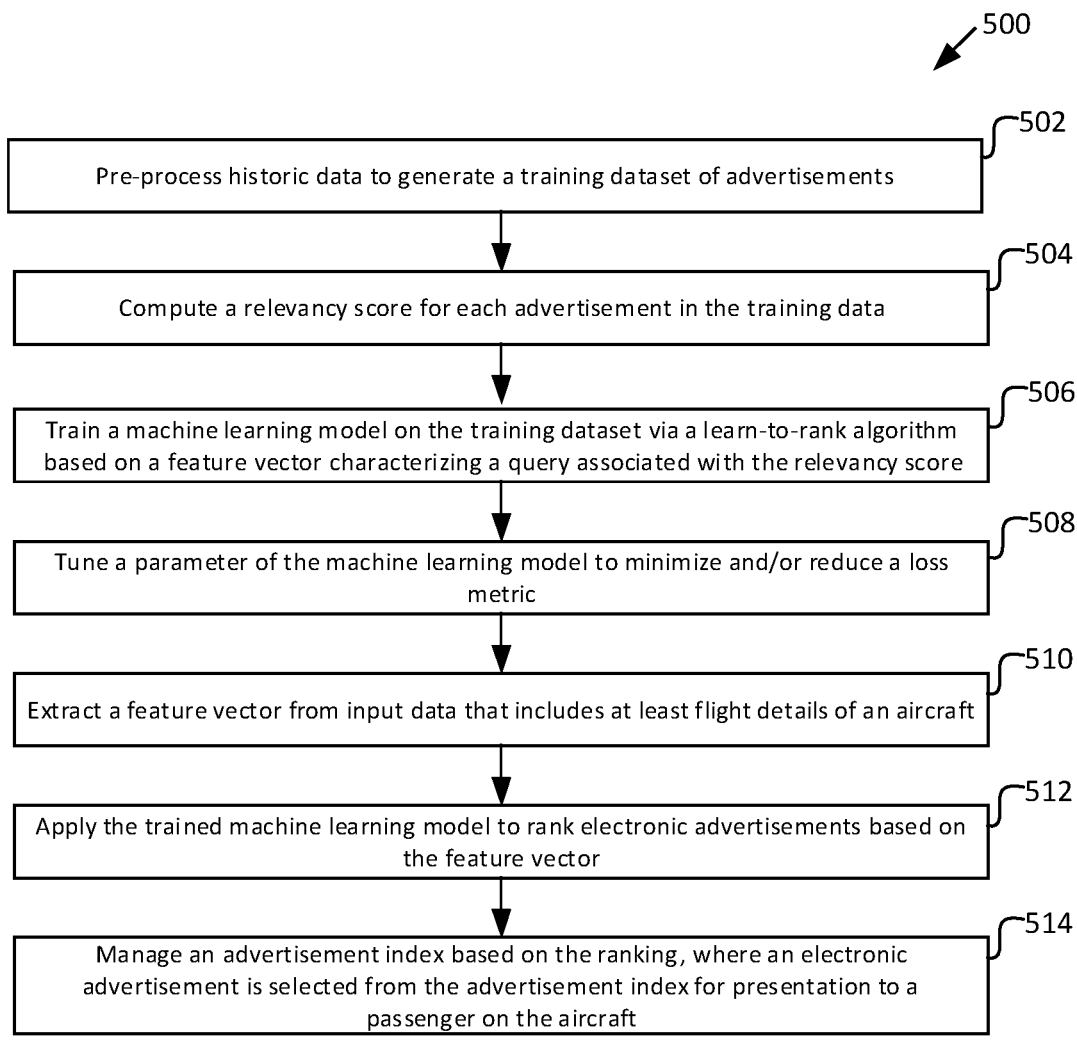
FIG. 5 illustrates a flow diagram of a non-limiting example computer-implemented method that can be implemented by a system to rank electronic advertisements for presentation on one or more aircraft using machine learning algorithms in accordance with one or more embodiments described herein.

In view of the foregoing structural and functional features described above, example methods will be better appreciated with reference to FIG. 5. While, for purposes of simplicity of explanation, the example methods of FIG. 5 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 5 illustrates a flow diagram of a non-limiting example computer-implemented method 500 that can be implemented by the system 100 to intelligently rank electronic advertisements using one or more machine learning algorithms in accordance with one or more embodiments described herein. In various embodiments, the system 100 can implement computer-implemented method 500 to tailor the selection of electronic advertisements towards a targeted audience based on a defined advertisement objective (e.g., to optimize advertisement interactions, viewership, and/or revenue).

At 502, the computer-implemented method 500 can include pre-processing (e.g., via a machine learning engine 114), by a system 100 operably coupled to one or more processing units 208, historic data to generate one or more training datasets 220 of electronic advertisements. At 504, the computer-implemented method 500 can include computing (e.g., via the machine learning engine 114), by the system 100, one or more relevancy scores for each electronic advertisement included in the one or more training datasets 220. In accordance with one or more embodiments described herein, the relevancy scores can be computed in accordance with one or more scoring functions 224 based on audience interactions and/or viewership associated with a given electronic advertisement within the context of a defined query (e.g., a training feature vector 304). In some embodiments, relevancy scores can be obtained in other ways, such as, for example, from human operators or a combination of human operators and computing. Additionally, the one or more training datasets 220 can include one or more groupings of training data that are sorted based on the defined query (e.g., training feature vector 304) upon which the relevancy score is based.

At 506, the computer-implemented method 500 can include training (e.g., via machine learning engine 114), by the system 100, one or more machine learning models 115 on the one or more training datasets 220 via one or more LTR algorithms 226 based on one or more feature vectors (e.g., training feature vectors 304) characterizing a query associated with the relevancy score. In accordance with various embodiments described herein, the training at 506 can be performed via a training stage 302, where the one or more machine learning models 115 learn to correlate electronic advertisement data 216 (e.g., metadata and/or event data) associated with the electronic advertisements included in the training dataset 220 with relevancy to the given training feature vector 304.

At 508, the computer-implemented method 500 can include tuning (e.g., via the machine learning engine), by the system 100, one or more parameters of the one or more machine learning models 115 to minimize and/or reduce a loss metric, as defined by one or more loss functions 308. In accordance with one or more embodiments described herein, the tuning at 508 can be implemented across multiple iterations of the ranking operations performed during the training stage 302. With each iteration, the machine learning models 115 can be further tuned to further reduce the loss metric based on a comparison of the resultant ranking and known ranking and/or relevancy scores included in the training dataset 220.

At 510, the computer-implemented method 500 can include extracting (e.g., via the advertisement analysis device 102), by the system 100, one or more feature vectors 406 from input data (e.g., flight details data 214 and/or behavior data 218) that includes at least flight details of an aircraft 108. In accordance with one or more embodiments described herein, The input data can be supplied via the one or more data pipelines 112 and can include flight details data 214 (e.g., the flight itinerary of an aircraft 108) and/or behavior data 218 (e.g., a passenger profile of one or more passengers of an aircraft 108).

At 512, the computer-implemented method 500 can include applying (e.g., via the machine learning engine 114), by the system 100, the one or more trained machine learning models 115 to rank a set of electronic advertisements 404 based on the one or more feature vectors 406 extracted at 510. In accordance with one or more embodiments described herein, the machine learning engine 114 can apply the one or more trained machine learning models 115 during an inference stage 402 to perform the ranking operation. In one or more embodiments, the machine learning engine 114 can apply an ensemble of trained machine learning models 115 to perform the ranking operation. In some embodiments, the machine learning engine 114 can generate multiple advertisement rankings 306 associated with the set of advertisements 404 and extracted feature vectors 406, which each advertisement ranking 306 associated with a respective advertisement objective. For example, each advertisement ranking 306 can be generated via a respective machine learning model 115 trained using a respective scoring function 224 and/or LTR algorithm 226.

At 514, the computer-implemented method 500 can include managing, by the system 100, one or more advertisement indexes 104 based on the ranking performed at 512, where an electronic advertisement is selected (e.g., via one or more advertisement engines 106) from the one or more advertisement indexes 104 for presentation to one or more passengers on the aircraft 108.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 6. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 6:
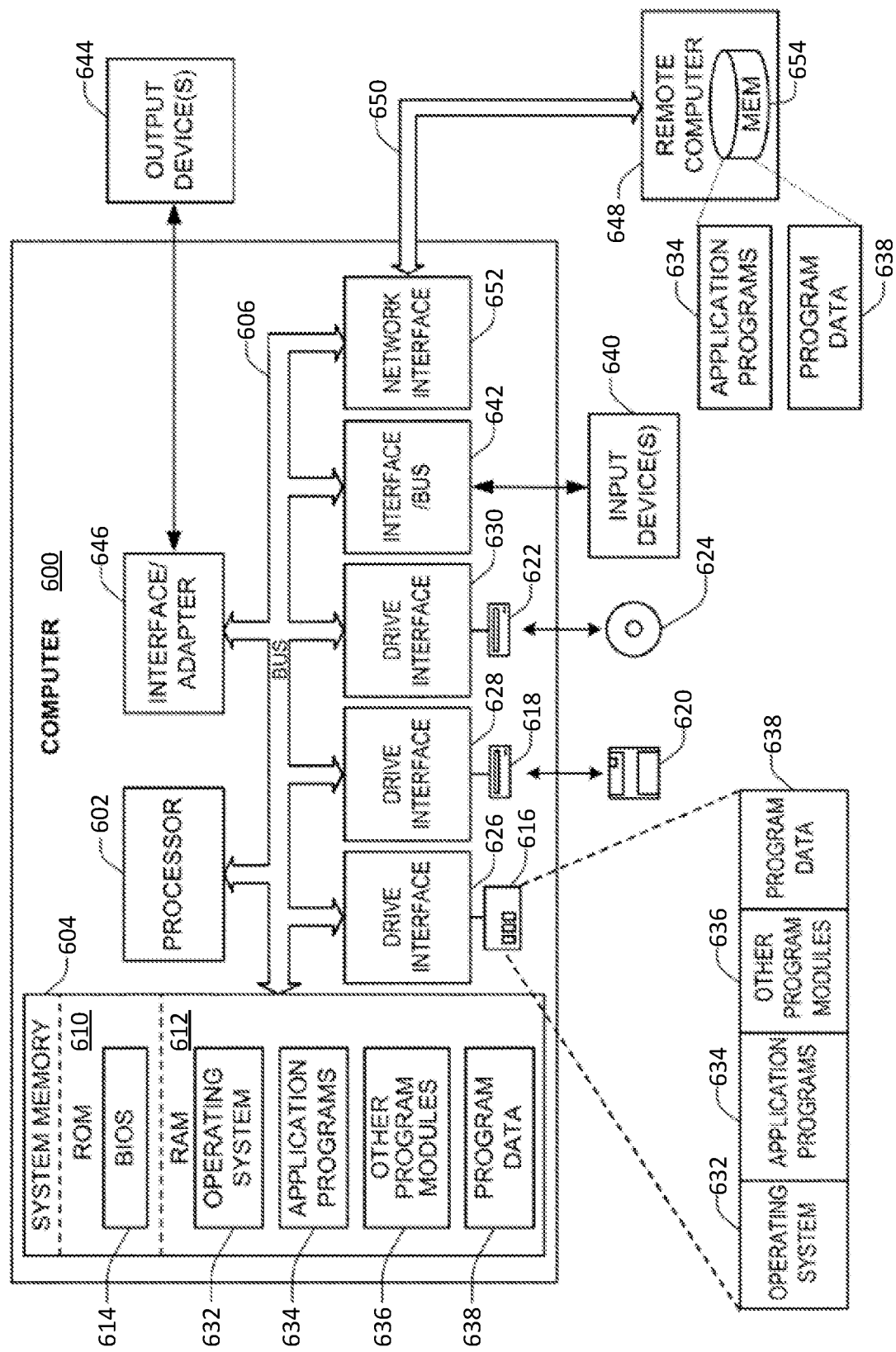
FIG. 6 illustrates a block diagram of non-limiting example computer environment that can be implemented within one or more systems described herein.

In this regard, FIG. 6 illustrates one example of a computer system 600 that can be employed to execute one or more embodiments of the present disclosure. Computer system 600 can be implemented on one or more general purpose networked computer systems, embedded computer systems, routers, switches, server devices, client devices, various intermediate devices/nodes or standalone computer systems. Additionally, computer system 600 can be implemented on various mobile clients such as, for example, a personal digital assistant (PDA), laptop computer, pager, and the like, provided it includes sufficient processing capabilities.

Computer system 600 includes processing unit 602, system memory 604, and system bus 606 that couples various system components, including the system memory 604, to processing unit 602. Dual microprocessors and other multi-processor architectures also can be used as processing unit 602. System bus 606 may be any of several types of bus structure including a memory bus or memory controller, a peripheral bus, and a local bus using any of a variety of bus architectures. System memory 604 includes read only memory (ROM) 610 and random access memory (RAM) 612. A basic input/output system (BIOS) 614 can reside in ROM 610 containing the basic routines that help to transfer information among elements within computer system 600.

Computer system 600 can include a hard disk drive 616, magnetic disk drive 618, e.g., to read from or write to removable disk 620, and an optical disk drive 622, e.g., for reading CD-ROM disk 624 or to read from or write to other optical media. Hard disk drive 616, magnetic disk drive 618, and optical disk drive 622 are connected to system bus 606 by a hard disk drive interface 626, a magnetic disk drive interface 628, and an optical drive interface 630, respectively. The drives and associated computer-readable media provide nonvolatile storage of data, data structures, and computer-executable instructions for computer system 600. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 610, including operating system 632, one or more application programs 634, other program modules 636, and program data 638. In some examples, the application programs 634 can include the machine learning engine 114 and/or scoring functions 224, and the program data 638 can include the flight details data 214, electronic advertisement data 216, behavior data 218, and/or training datasets 220. The application programs 634 and program data 638 can include functions and methods programmed to rank a set of electronic advertisements based on input data that includes flight details of an aircraft and/or behavior data of a passenger of the aircraft, such as shown and described herein.

A user may enter commands and information into computer system 600 through one or more input devices 640, such as a pointing device (e.g., a mouse, touch screen), keyboard, microphone, joystick, game pad, scanner, and the like. For instance, the user can employ input device 640 to edit or modify the one or more scoring functions in accordance with an advertisement objective and/or modify the one or more loss functions in accordance with a model optimization objective. These and other input devices 640 are often connected to processing unit 602 through a corresponding port interface 642 that is coupled to the system bus, but may be connected by other interfaces, such as a parallel port, serial port, or universal serial bus (USB). One or more output devices 644 (e.g., display, a monitor, printer, projector, or other type of displaying device) is also connected to system bus 606 via interface 646, such as a video adapter.

Computer system 600 may operate in a networked environment using logical connections to one or more remote computers, such as remote computer 648. Remote computer 648 may be a workstation, computer system, router, peer device, or other common network node, and typically includes many or all the elements described relative to computer system 600. The logical connections, schematically indicated at 650, can include a local area network (LAN) and a wide area network (WAN). When used in a LAN networking environment, computer system 600 can be connected to the local network through a network interface or adapter 652. When used in a WAN networking environment, computer system 600 can include a modem, or can be connected to a communications server on the LAN. The modem, which may be internal or external, can be connected to system bus 606 via an appropriate port interface. In a networked environment, application programs 634 or program data 638 depicted relative to computer system 600, or portions thereof, may be stored in a remote memory storage device 654.

Experiment Data

In an example experiment to demonstrate one or more features of the advertisement analysis device 102 described herein, two machine learning models 115 were trained in accordance with the training stage 302. The first machine learning model 115 was an XGBoost model trained via an LTR algorithm 226 that utilizes the listwise approach. The second machine learning model 115 as a TensorFlow model trained via an LTR algorithm 226 that utilizes the listwise approach. In one or more embodiments, the two models of the same model architecture can be trained via respective LTR algorithms 226 (e.g., one implementing a listwise approach, while the other implements a pairwise approach) to facilitate A/B testing of model performance. The LTR algorithm 226 of the XGBoost machine learning model 115 does not use a neural network, as opposed to the Tensor Flow machine learning model 115, but instead uses regularizing gradient boosting. For example, the relevancy predictions are made by summing the original estimate of a first decision tree with all corrections imposed by subsequent decision trees (e.g., via a gradient boosting). The machine learning models 115 were trained separately, and the inference was performed separately. However, as described herein, one or more embodiments envisage improving model accuracy by applying an ensemble of machine learning models 115 to leverage a plurality of machine learning algorithms during the inference stage 402.

The machine learning models 115 were selected after performing model selection via hyper-parameter tuning. Also, a set of different values were applied for the machine learning models' 115 number of estimators, learning rate, and/or maximum depth parameters. Further, the machine learning engine 114 applied a nested cross validation to split the training dataset 220 into training, validation, and test dataset in favor of reducing the accuracy loss.

NDCG was used as the loss function 308 to measure ranking quality across implementations of the respective machine learning models 115. NDCG is a metric used to compare ranking and recommendation models, where the NDCG metric ranges between greater than or equal to zero and less than or equal to one. The higher the NDCG metric value the more accurate the resultant ranking operation. The NDCG loss function 308 can calculate the cumulative gain at each position in the carousel for a chosen value of a first n number of offers. For example, the NDCG loss function 308 was applied for an n value of 3, 5, and 10, as shown in Table 1 below.

TABLE 1

| Comparison Metric | XGBoost | TensorFlow |
| --- | --- | --- |
| NDCG @ 3 | 0.589 | 0.681 |
| NDCG @ 5 | 0.663 | 0.682 |
| NDCG @ 10 | 0.666 | 0.682 |

Additional Embodiments

The present disclosure is also directed to the following exemplary embodiments, which can be practiced in any combination thereof.

Embodiment 1: A computer-implemented method for ranking electronic advertisements, the computer-implemented method comprising: executing a learn-to-rank algorithm to train a machine learning model on a training dataset that includes electronic advertisements with associated scores characterizing a relevancy between the electronic advertisements and a defined query; and applying the trained machine learning model to rank a set of electronic advertisements based on a feature vector characterizing input data that includes flight details of an aircraft.

Embodiment 2: The computer-implemented method of embodiment 1, wherein the flight details of the aircraft describe a departure location of the aircraft, a destination of the aircraft, or a combination thereof.

Embodiment 3: The computer-implemented method of embodiments 1 or 2, wherein the input data further includes behavior data associated with a passenger of the aircraft.

Embodiment 4: The computer-implemented method of any of embodiments 1-3, wherein the trained machine learning model is applied while the aircraft is in transit, and wherein the feature vector is defined or re-defined while the aircraft is in transit.

Embodiment 5: The computer-implemented method of any of embodiments 1-4, further comprising: computing the associated scores by a function of historic audience interactions and viewership of the electronic advertisements, wherein the function includes a weighted metric for audience interactions that resulted in an engagement of a service offered by the electronic advertisements or a purchase of a product offered by the electronic advertisements Embodiment 6: The computer-implemented method of any of embodiments 1-5, further comprising: generating an advertisement index that includes the ranking of the set of electronic advertisements; and selecting an electronic advertisement from the set of electronic advertisements based on the ranking for presentation to a passenger on the aircraft.

Embodiment 7: The computer-implemented method of any of embodiments 1-6, wherein the applying the trained machine learning model to rank the set of electronic advertisements is performed independent of the selecting the electronic advertisement.

Embodiment 8: A system, comprising: memory to store computer executable instructions; and one or more processors, operatively coupled to the memory, that execute the computer executable instructions to implement: a machine learning engine having a training stage and an inference stage, wherein the inference stage is configured to, based on at least one machine learning model, rank a set of electronic advertisements based on a feature vector characterizing input data that includes flight details of an aircraft.

Embodiment 9: The system of embodiment 8, wherein the training stage is configured to train, by a learn-to-rank algorithm, the machine learning model on a training dataset that includes electronic advertisement data with associated scores characterizing a relevancy between the electronic advertisements and a defined query.

Embodiment 10: The system of embodiment 8 or 9, wherein inference stage is configured to rank the set of electronic advertisements based on an ensemble of machine learning models, and wherein the at least one machine learning model is included within the ensemble of machine learning models.

Embodiment 11: The system of any of embodiments 8-10, wherein the associated scores are computed based on a function of historic audience interactions and viewership of the electronic advertisements, wherein the function includes a weighted metric for audience interactions that resulted in an engagement of a service offered by the electronic advertisements or a purchase of a product offered by the electronic advertisements.

Embodiment 12: The system of any of embodiments 8-11, wherein the input data is defined while the aircraft is in transit, and wherein the inference stage is configured to rank the set of electronic advertisements while the aircraft is in transit.

Embodiment 13: The system of any of embodiments 8-12, wherein the aircraft is associated with a plurality of passengers, and wherein the input data further includes behavior data regarding a first passenger from the plurality of passengers independent of a second passenger from the plurality of passengers.

Embodiment 14: The system of any of embodiments 8-13, further comprising: an advertisement engine configured to select an electronic advertisement from the set of electronic advertisements based on the ranking by the machine learning engine, wherein the electronic advertisement is selected for presentation to a passenger of the aircraft, wherein the advertisement engine is coupled to an infotainment system of the aircraft via a satellite communication, and wherein the selected electronic advertisement is presented to the passenger via the infotainment system.

Embodiment 15: The system of any of embodiments 8-14, wherein the training stage and the inference stage of the machine learning engine are executed independent of selection operations by the advertisement engine.

Embodiment 16: A computer program product for intelligent electronic advertisement ranking, the computer program product comprising a computer readable storage medium having computer executable instructions embodied therewith, the computer executable instructions executable by one or more processors to cause the one or more processors to: execute a machine learning engine having a training stage and an inference stage, wherein the inference stage is configured to, based on a machine learning model implementing a learn-to-rank algorithm, rank a set of electronic advertisements in order of relevancy between electronic advertisements from the set of electronic advertisements and a feature vector characterizing input data that includes flight details of an aircraft.

Embodiment 17: The computer program product of embodiment 16, wherein the inference stage is configured to predict the relevancy between the electronic advertisements and the feature vector based on historic engagement of an audience with the electronic advertisements during a previous flight.

Embodiment 18: The computer program product of embodiment 16 or 17, wherein the training stage is configured to execute the learn-to-rank algorithm to train the machine learning model on a training dataset that includes relevancy scores that are a function of the historic engagement.

Embodiment 19: The computer program product of any of embodiments 16-18, wherein the inference stage is further configured to, based on a second machine learning model, generate a second ranking of the set of electronic advertisements in order of the relevancy between the electronic advertisements and the feature vector, wherein the machine learning model is trained on a first training dataset that includes first relevancy scores determined by a first function, and wherein the second machine learning model is trained on a second training dataset that includes second relevancy scores determined by a second function.

Embodiment 20: The computer program product of any of embodiments 16-19, wherein the first function is defined in accordance with a first advertisement objective, and wherein the second function is defined in accordance with a second advertisement objective.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
   executing a learn-to-rank algorithm to train at least one machine learning model on a training dataset that includes electronic advertisements, the electronic advertisements having associated scores and the associated scores characterizing a relevancy between the electronic advertisements and a defined query, wherein the executing includes training the at least one machine learning model including:
   inputting the training dataset to the at least one machine learning model, the training data set generated from input data from one or more data pipelines communicatively coupled to one or more advertisement analysis devices that query the one or more data pipelines for a defined duration;
   comparing, to the training data set, one or more output datasets from the at least one machine learning model; and
   based on the comparing, adjusting one or more weights of the at least one machine learning model to obtain a trained machine learning model; and
   applying the trained machine learning model to rank a set of electronic advertisements based on at least one feature vector, the at least one feature vector characterizing input data that includes flight details of an aircraft, wherein the trained machine learning model is applied while the aircraft is in transit, and wherein the feature vector is defined or re-defined while the aircraft is in transit.

2. The computer-implemented method of claim 1, wherein the flight details of the aircraft describe a departure location of the aircraft, a destination of the aircraft, or a combination thereof.

3. The computer-implemented method of claim 2, wherein the input data further includes behavior data associated with a passenger of the aircraft.

4. The computer-implemented method of claim 1, further comprising:
   computing the associated scores by a function of historic audience interactions and viewership of the electronic advertisements, wherein the function includes a weighted metric for audience interactions that resulted in an engagement of a service offered by the electronic advertisements or a purchase of a product offered by the electronic advertisements.

5. The computer-implemented method of claim 1, further comprising:
   generating an advertisement index that includes the ranking of the set of electronic advertisements; and
   selecting an electronic advertisement from the set of electronic advertisements based on the ranking for presentation to a passenger on the aircraft.

6. The computer-implemented method of claim 5, wherein the applying the trained machine learning model to rank the set of electronic advertisements is performed independent of the selecting the electronic advertisement.

7. The computer-implemented method of claim 1, wherein the one or more data pipelines comprise multiple data pipelines.

8. A system, comprising:
   memory to store computer executable instructions; and
   one or more processors, operatively coupled to the memory, that execute the computer executable instructions to implement:
   a machine learning engine having a training stage and an inference stage, wherein:
   the training stage is configured to train, by a learn-to-rank algorithm, at least one machine learning model on a training dataset that includes electronic advertisement data having associated scores and the associated scores characterizing a relevancy between the electronic advertisements and a defined query, wherein the training stage is further configured to:
   input the training dataset to the at least one machine learning model, the training data set generated from input data from one or more data pipelines, the one or more data pipelines communicatively coupled to one or more advertisement analysis devices that query the one or more data pipelines for a defined duration;
   compare, to the training data set, one or more output datasets from the at least one machine learning model; and based on the comparing, adjust one or more weights of the at least one machine learning model to obtain a trained machine learning model; and the inference stage is configured to, based on at least one trained machine learning model, rank a set of electronic advertisements based on at least one feature vector characterizing input data that includes flight details of an aircraft, wherein the trained machine learning model is applied while the aircraft is in transit, and wherein the at least one feature vector is defined or re-defined while the aircraft is in transit.

9. The system of claim 8, wherein inference stage is configured to rank the set of electronic advertisements based on an ensemble of machine learning models, and wherein the at least one machine learning model is comprised within the ensemble of machine learning models.

10. The system of claim 8, wherein the associated scores are computed based on a function of historic audience interactions and viewership of the electronic advertisements, wherein the function includes a weighted metric for audience interactions that resulted in an engagement of a service offered by the electronic advertisements or a purchase of a product offered by the electronic advertisements.

11. The system of claim 8, wherein the input data is defined while the aircraft is in transit, and wherein the inference stage is configured to rank the set of electronic advertisements while the aircraft is in transit.

12. The system of claim 8, wherein the aircraft is associated with a plurality of passengers, and wherein the input data further includes behavior data regarding a first passenger from the plurality of passengers independent of a second passenger from the plurality of passengers.

13. The system of claim 8, further comprising:

an advertisement engine configured to select an electronic advertisement from the set of electronic advertisements based on the ranking by the machine learning engine, wherein the electronic advertisement is selected for presentation to a passenger of the aircraft, wherein the advertisement engine is coupled to an infotainment system of the aircraft via a satellite communication, and wherein the selected electronic advertisement is presented to the passenger via the infotainment system.

14. The system of claim 13, wherein the training stage and the inference stage of the machine learning engine are executed independent of selection operations by the advertisement engine.

15. The system of claim 8, wherein the one or more data pipelines comprise multiple data pipelines.

16. A computer program product for intelligent electronic advertisement ranking, the computer program product comprising a non-transitory computer readable storage medium having computer executable instructions embodied therewith, the computer executable instructions executable by one or more processors to cause the one or more processors to:

execute a machine learning engine having a training stage and an inference stage, wherein:

the training stage is configured to execute the learn-to-rank algorithm to train at least one machine learning model on a training dataset that includes relevancy scores that are a function of the historic engagement, and wherein to train the at least one machine learning model the training stage is configured to:

input the training dataset to the at least one machine learning model, the training data set generated from input data from one or more data pipelines, the one or more data pipelines communicatively coupled to one or more advertisement analysis devices that query the one or more data pipelines for a defined duration;

compare, to the training data set, one or more output datasets from the at least one machine learning model; and based on the comparing, adjust one or more weights of the at least one machine learning model to obtain a trained machine learning model; and the inference stage is configured to, based on the trained machine learning model implementing a learn-to-rank algorithm, rank a set of electronic advertisements in order of relevancy between electronic advertisements from the set of electronic advertisements and at least one feature vector characterizing input data that includes flight details of an aircraft, wherein the trained machine learning model is applied while the aircraft is in transit, and wherein the at least one feature vector is defined or re-defined while the aircraft is in transit.

17. The computer program product of claim 16, wherein the one or more weights are adjusted based on historic engagement of an audience with the electronic advertisements during a previous flight.

18. The computer program product of claim 16, wherein the inference stage is further configured to, based on a second machine learning model, generate a second ranking of the set of electronic advertisements in order of the relevancy between the electronic advertisements and the at least one feature vector, wherein the machine learning model is trained on a first training dataset that includes first relevancy scores determined by a first function, and wherein the second machine learning model is trained on a second training dataset that includes second relevancy scores determined by a second function.

19. The computer program product of claim 18, wherein the first function is defined in accordance with a first advertisement objective, and wherein the second function is defined in accordance with a second advertisement objective.

20. The computer program product of claim 16, wherein the one or more data pipelines comprise multiple data pipelines.

* * * * *